United States Patent
Yun (10) Patent No.: US 7,564,608 B2
(45) Date of Patent: Jul. 21, 2009

(54) RASTER SCANNING-TYPE DISPLAY DEVICE USING DIFFRACTIVE LIGHT MODULATOR

(75) Inventor: Sang Kyeong Yun, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 465 days.

(21) Appl. No.: 11/642,447

(22) Filed: Dec. 19, 2006

(65) Prior Publication Data

US 2007/0153270 A1 Jul. 5, 2007

(30) Foreign Application Priority Data

Dec. 29, 2005 (KR) ............ 10-2005-0133758

(51) Int. Cl.
*G02B 26/08* (2006.01)
(52) U.S. Cl. ............ 359/202.1; 359/201.1; 359/201.2; 359/204.2; 359/618; 353/34
(58) Field of Classification Search .............. None
See application file for complete search history.

(56) References Cited

U.S. PATENT DOCUMENTS

| | | | |
|---|---|---|---|
| 5,311,360 A | 5/1994 | Bloom | |
| 6,798,575 B2 * | 9/2004 | Kobayashi | ............ 359/618 |
| 7,042,606 B2 * | 5/2006 | Yang et al. | ............ 359/204.2 |
| 2003/0039036 A1 | 2/2003 | Kruschwitz | |

FOREIGN PATENT DOCUMENTS

| | | |
|---|---|---|
| JP | 2-39018 A | 2/1990 |
| JP | 2004-157522 A | 6/2004 |
| KR | 10-2005-0118105 A | 12/2005 |

* cited by examiner

*Primary Examiner*—James Phan
(74) *Attorney, Agent, or Firm*—Christensen O'Connor Johnson Kindness PLLC (57) ABSTRACT

Disclosed herein is a raster scanning-type display device using a diffractive light modulator. The diffractive light modulator includes a plurality of light sources, the diffractive light modulator, a plurality of illumination optical units, a combining unit, a Schlieren optical unit, and a scanning optical unit.

7 Claims, 7 Drawing Sheets

FIG. 5

RASTER SCANNING-TYPE DISPLAY DEVICE USING DIFFRACTIVE LIGHT MODULATOR

CROSS REFERENCE TO RELATED APPLICATION

This application claims the benefit of Korean Patent Application No. 10-2005-0133758, filed on Dec. 29, 2005, entitled "Raster Scanning Type Display Apparatus using the Diffraction Optical Modulation," which is hereby incorporated by reference in its entirety into this application.

BACKGROUND OF THE INVENTION

1. Field of the Invention

The present invention relates generally to a display device using a diffractive light modulator, and, more particularly, to a raster scanning-type display device using a diffractive light modulator, which causes each of a plurality of beams of light, emitted from a plurality of light sources, to be incident on one or more elements assigned to each wavelength, forms a plurality of beams of diffracted light for respective wavelengths, converts the plurality of beams of diffracted light for the respective wavelengths into a plurality of beams of spot light, combines the plurality of beams of spot light for the respective wavelengths together, and scans the combined spot light across a screen in a raster scanning fashion.

2. Description of the Related Art

With the development of microtechnology, Micro-Electro-Mechanical Systems (MEMS) devices and small-sized equipment, into which MEMS devices are incorporated, are attracting attention.

A MEMS device is formed on a substrate, such as a silicon substrate or a glass substrate, in microstructure form, and is a device into which an actuator for outputting mechanical actuating force and a semiconductor Integrated Circuit (IC) for controlling the actuator are electrically or mechanically combined. The fundamental feature of such a MEMS device is that an actuator having a mechanical structure is incorporated as part of the device. The actuator is electrically operated using Coulomb's force between electrodes.

Recently, light modulators using such MEMS devices have been developed. An example of such an optical device is a Grating Light Valve (GLV) that is disclosed in U.S. Pat. No. 5,311,360, issued to Bloom et al. In this patent, the GLV may be constructed to operate in reflective and diffractive modes.

In order to use the GLVs in display devices, the development of appropriate display devices is required.

SUMMARY OF THE INVENTION

An object of the present invention is to provide a raster scanning-type display device using a diffractive light modulator, which causes each of a plurality of beams of light, emitted from a plurality of light sources, to be incident on one or more elements, assigned to each wavelength, forms a plurality of beams of diffracted light for respective wavelengths, converts the plurality of beams of diffracted light for the respective wavelengths into a plurality of beams of spot light, combines the plurality of beams of spot light for the respective wavelengths together, and scans the combined spot light across a screen in a raster scanning fashion.

In order to accomplish the above object, the present invention provides a raster scanning-type display device using a diffractive light modulator, including a plurality of light sources for emitting a plurality of beams of light having respective colors; the diffractive light modulator provided with a plurality of elements with colors respectively assigned to the elements, and configured to modulate incident light while vertically moving the elements according to external control signals and then to emit a plurality of beams of light having respective colors and each having a plurality of diffraction orders when the incident light having a plurality of colors is incident on corresponding elements; a plurality of illumination optical units for radiating the plurality of beams of light having respective colors, emitted from the light sources, onto the corresponding elements of the diffractive light modulator; a combining unit for combining the plurality of beams of light having respective colors and each having a plurality of diffraction orders, formed by the diffractive light modulator, together; a Schlieren optical unit for selecting diffracted light having one or more desired diffraction orders from the plurality of beams of light having respective colors and each having a plurality of diffraction orders, and passing the selected diffracted light therethrough; and a scanning optical unit for scanning the diffracted light, passed through the Schlieren optical unit, onto a screen in a raster scanning fashion.

In order to accomplish the above object, the present invention provides a raster scanning-type display device using a diffractive light modulator, including a plurality of light sources for emitting a plurality of beams of light having respective colors; the diffractive light modulator provided with a plurality of elements with the elements grouped into element groups and colors respectively assigned to the element groups, and configured to modulate incident light while vertically moving elements of a corresponding element group according to external control signals, and then to emit diffracted light having a plurality of diffraction orders when the incident light is incident on the elements of the corresponding element group; a plurality of illumination optical units for radiating the plurality of beams of light having respective colors, emitted from the light sources, onto corresponding element groups of the diffractive light modulator; a combining unit for combining the plurality of beams of light having respective colors and each having a plurality of diffraction orders, formed by the diffractive light modulator, together; a Schlieren optical unit for selecting diffracted light having one or more desired diffraction orders from the plurality of beams of light having respective colors and each having a plurality of diffraction orders, and passing the selected diffracted light therethrough; and a scanning optical unit for scanning the diffracted light, passed through the Schlieren optical unit, onto a screen in a raster scanning fashion.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Reference now should be made to the drawings, in which the same reference numerals are used throughout the different drawings to designate the same or similar components.

Figure 1A:
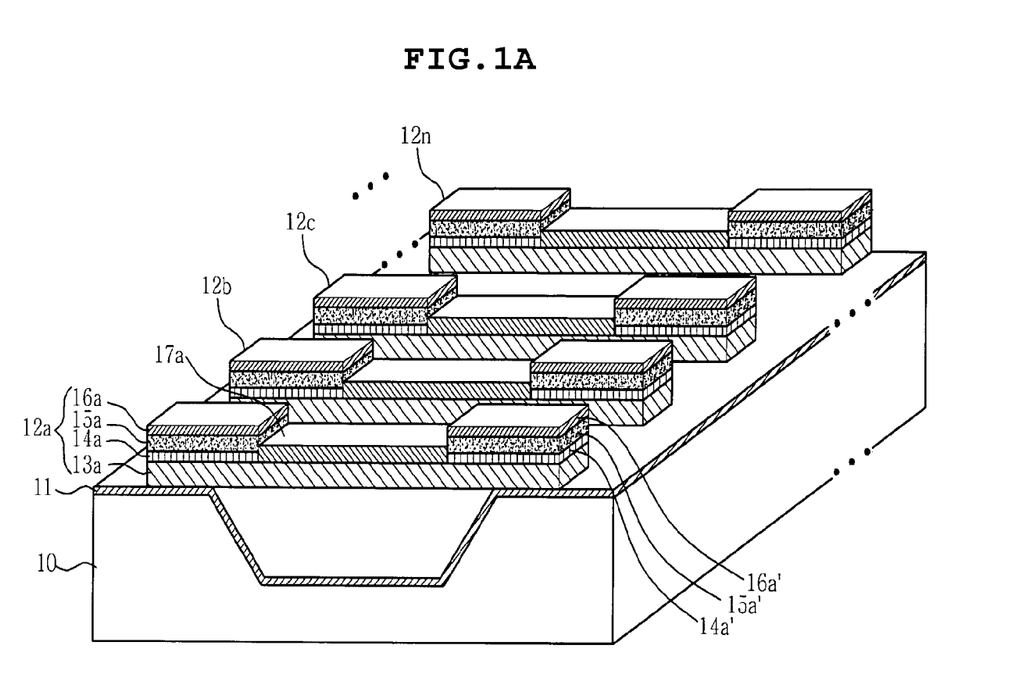
FIG. 1A is a section view of a recess-type diffractive light modulator using piezoelectric material.
Figure 1B:
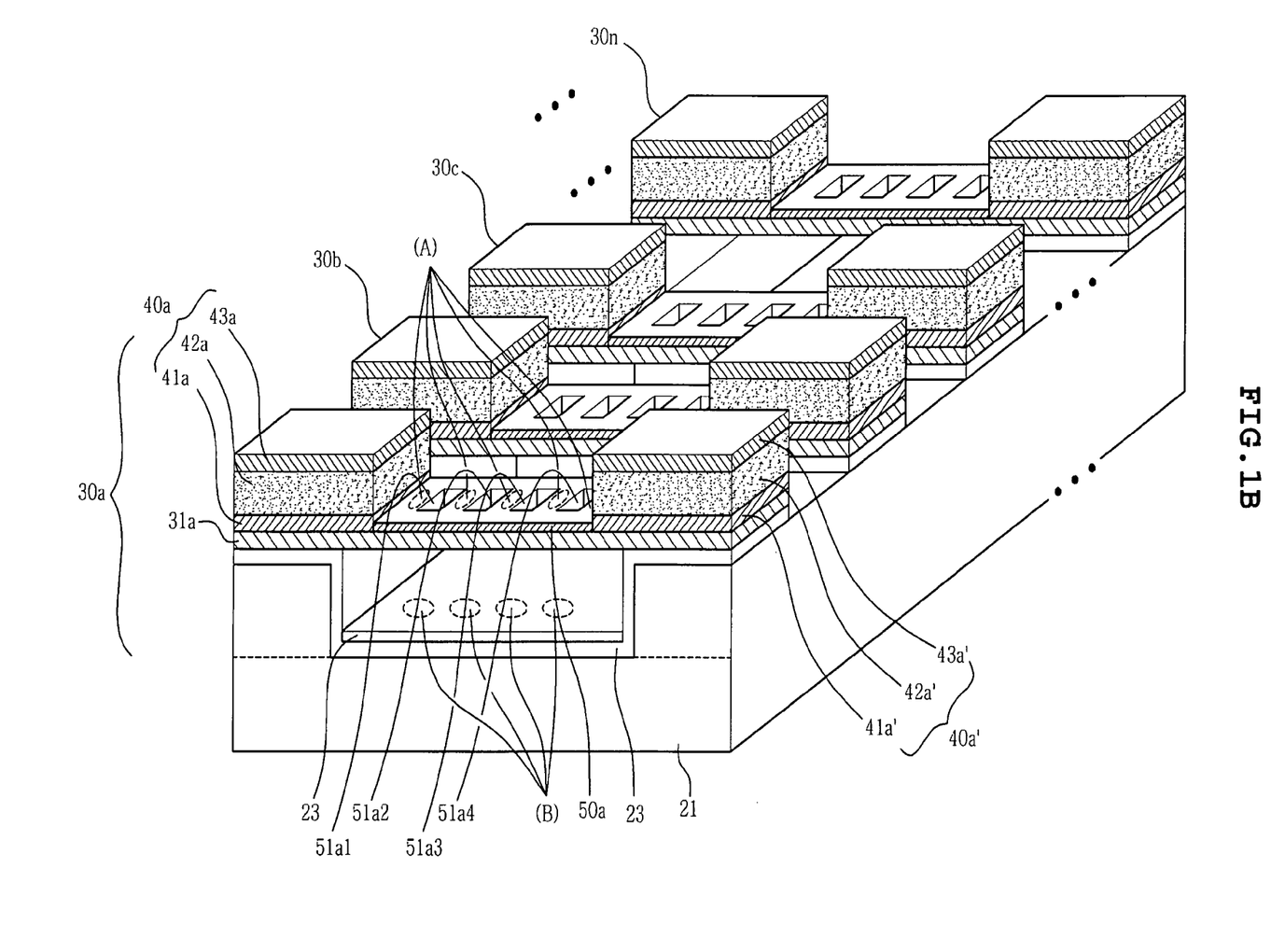
FIGS. 1B and 1C are sectional views of open hole-based diffractive light modulators using piezoelectric material.
Figure 1C:
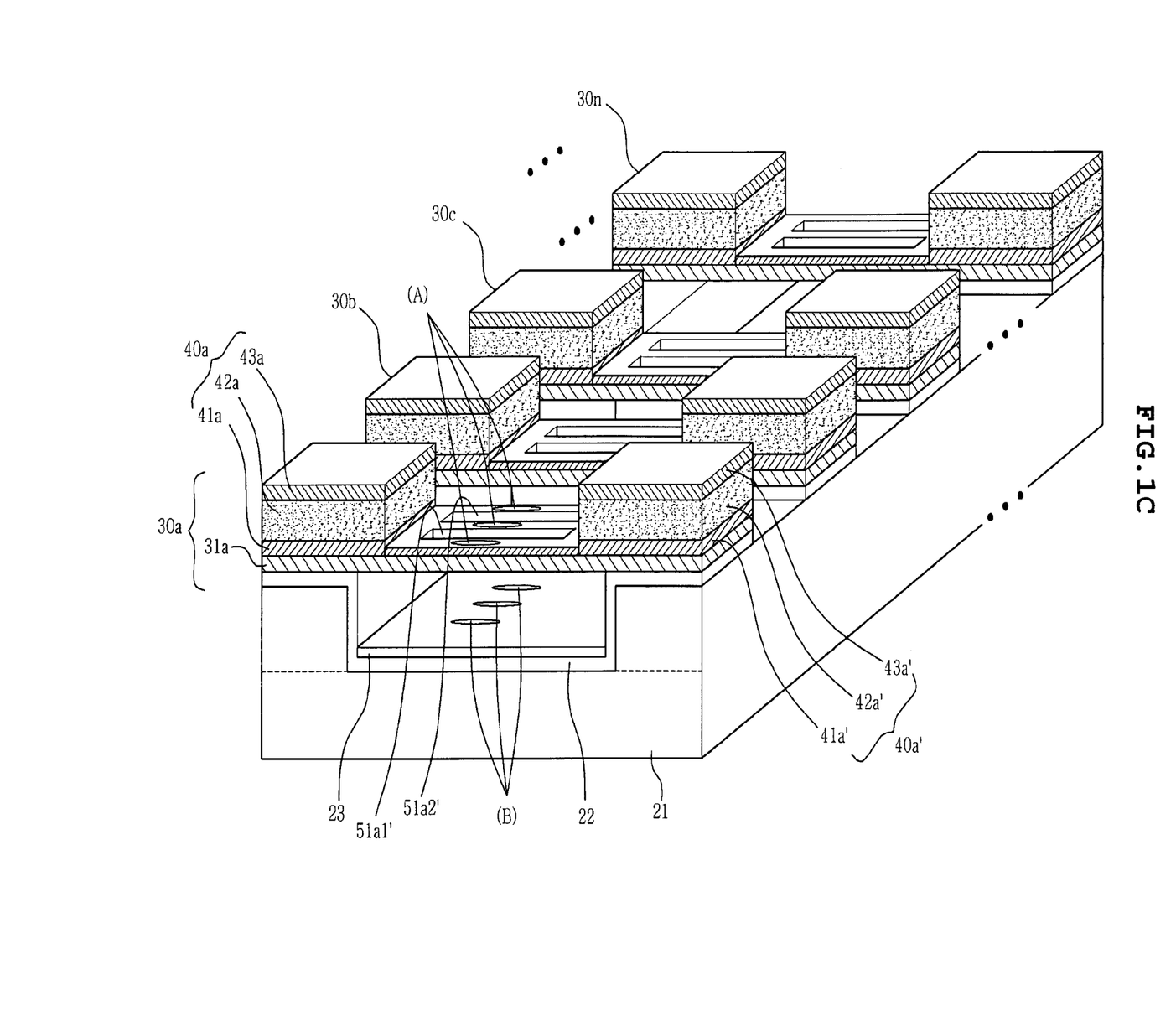

FIG. 1A is a section view of a recess-type diffractive light modulator using piezoelectric material, and FIGS. 1B and 1C are sectional views of an open hole-based diffractive light modulator using piezoelectric material.

Referring to the drawing, the recess-type diffractive light modulator includes a silicon substrate 10 and a plurality of elements 12a~12n.

The elements 12a~12n have a uniform width and are regularly arranged. In the elements 12a~12n, beams of incident light are reflected by micromirrors (the micromirror 17a in the case of the element 12a) and adjacent beams of reflected light cause diffraction, thus forming diffracted light and a video image. That is, for example, light reflected from the micromirror 17a of the element 12a and light reflected from the micromirror of the element 12b form diffracted light when the difference in vertical location between the micromirror 17a of the element 12a and the micromirror of the element 12b is ¼ times wavelength λ (the difference can be produced through control because the elements 12a~12n can be moved vertically), and a video image can be formed using the light intensity of the diffracted light.

The silicon substrate 10 has a recess so as to provide an air space for the element 12a~12n. An insulating layer 11 is disposed on the upper surface of the silicon substrate 10, and the ends of the element 12a~12n are attached to the opposite sides of the recess.

Each of the elements 12a~12n (although only the element 12a is described in detail here, the same description is applicable to the remaining elements 12b~12n) has a rod shape. The bottom surfaces of the ends of the element 12a are attached to the opposite sides of the silicon substrate 10 so that the central portion of the element 12a spans the recess of the silicon substrate 10. The element 12a includes a lower support 13a, a portion of which, which is located over the recess of the silicon substrate 10, can move vertically.

Furthermore, the element 12a further includes a lower electrode layer 14a that provides piezoelectric voltage, a piezoelectric material layer 15a that is disposed on the lower electrode layer 14a and generates vertical actuation force through expansion and contraction thereof when voltage is applied across both surfaces thereof, and an upper electrode layer 16a that is disposed on the piezoelectric material layer 15a and provides piezoelectric voltage to the piezoelectric material layer 15a. These components are disposed at the left end of the lower support 13a.

The element 12a further includes a lower electrode layer 14a' that provides piezoelectric voltage, a piezoelectric material layer 15a' that is disposed on the lower electrode layer 14a' and generates vertical actuation force through expansion and contraction thereof when voltage is applied to both surfaces thereof, and an upper electrode layer 16a' that is disposed on the piezoelectric material layer 15a' and provides piezoelectric voltage to the piezoelectric material layer 15a'. These components are disposed at the right end of the lower support 13a.

The element 12a further includes a micromirror 17a that is placed on the central portion of the lower support 13a and reflects incident light, thus forming diffracted light.

FIG. 1B is a perspective view of an open hole-based diffractive light modulator. Referring to FIG. 1B, the open hole-based diffraction light modulator includes a silicon substrate 21, an insulation layer 22, a lower or proximal micromirror 23 and a plurality of elements 30a to 30n.

In this case, the lower micromirror 23 is deposited on the top of the silicon substrate 21, and reflects incident light, thereby diffracting the incident light. The lower micromirror 23 may be made of metal, such as Al, Pt, Cr, or Ag.

The element 30a (although only the element 30a is described in detail here, the same description is applicable to the remaining elements) has a ribbon shape. The element 30a includes a lower support 31a, the bottom surfaces of the ends of which are attached to the opposite sides of the silicon substrate 21 beside the recess of the silicon substrate 21 so that the central portion of the lower support 31a spans the recess of the silicon substrate 21.

Piezoelectric layers 40a and 40a' are respectively formed on both sides of the lower support 231a. The actuation force of the element 30a is generated through the contraction and expansion of the piezoelectric layers 40a and 40a'.

The piezoelectric layers 40a and 40a' include lower electrode layers 41a and 41a' that provide piezoelectric voltage, piezoelectric material layers 42a and 42a' that are respectively placed on the tops of the lower electrode layers 41a and 42a' and contract and expand to thus generate vertical actuation force when voltage is applied to both surfaces of each of thereof, and upper electrode layers 43a and 43a' that are respectively placed on the piezoelectric material layers 42a and 42a' and provide piezoelectric voltage to the piezoelectric material layers 42a and 42a'. When voltage is applied to the upper electrode layers 43a and 43a' and the lower electrode layers 41a and 42a', the piezoelectric material layers 42a and 42a' contract and expand, thus causing the vertical movement of the lower support 31a.

Meanwhile, an upper or distal micromirror 50a is deposited on the central portion of the lower support 31a, and includes a plurality of open holes 51a1 to 51a4. Although the shape of the open holes 51a1 to 51a4 is preferably rectangular, they may have any closed curve, such as a circle or an ellipse. When the lower support 31a is made of optically reflective material, it is not necessary to deposit a separate upper mirror, and the lower support 31a may function as the upper micromirror.

The open holes 51a1 to 51a4 allow light, which is incident on the element 30a, to pass therethrough and be incident on the portions of the lower micromirror 23 corresponding to the locations of the open holes 51a1 to 51a4, therefore the lower micromirror 23 and the upper micromirror 50a can form a pixel.

As an example, each of portions (A) of the upper micromirror 50a beside the open holes 51a1 to 51a4 and a corresponding portion (B) of the lower micromirror 23 can form a single pixel.

The incident light, which passes through the portions of the upper micromirror 50a in which the open holes 51a1 to 51a4 are formed, can be incident on the corresponding portions of the lower micromirror 23. When the distance between the upper micromirror 50*a* and the lower micromirror 23 is an odd multiple of λ/4, maximally diffracted light can be generated.

Meanwhile, FIG. 1B illustrates an open hole-based light diffractive modulator characterized in that the open holes 51*a*1 to 51*a*4 are arranged in a direction identical to the longitudinal direction of the upper micromirror 50*a*, while FIG. 1C illustrates an open hole-based light modulator in which a plurality of open holes 51*a*1' and 51*a*2' is arranged in a direction perpendicular to the longitudinal direction of the upper or distal micromirror 50*a*.

With reference to FIGS. 2 to 5, a raster scanning-type display device using a diffractive light modulator is described.

Figure 2:
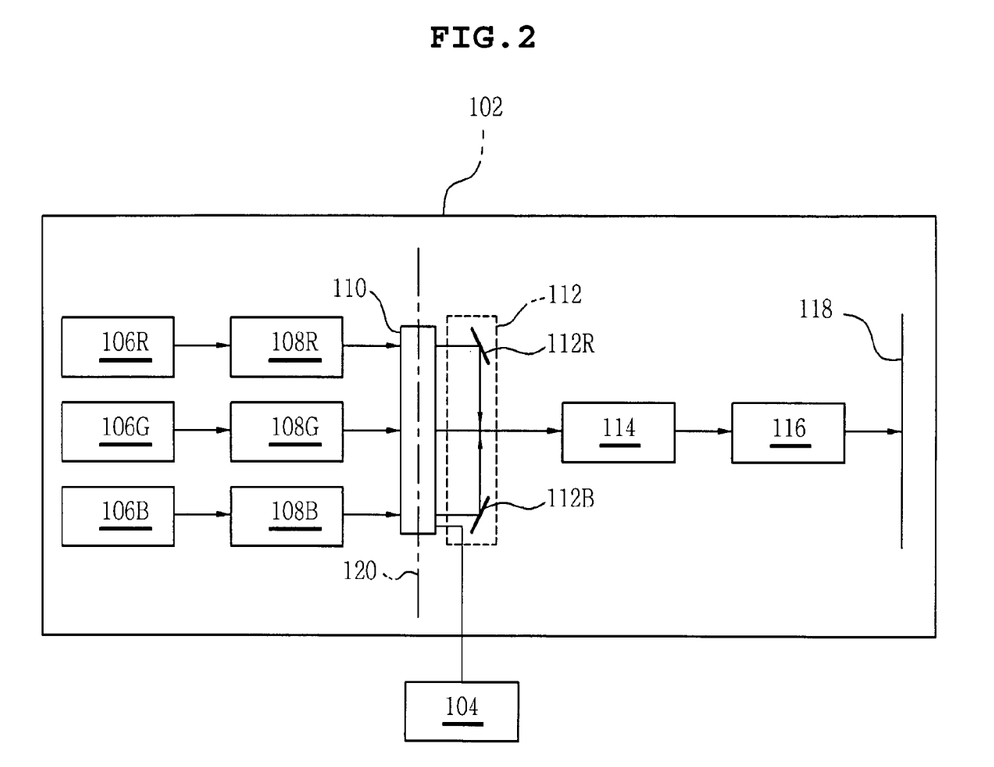
FIG. 2 is a view illustrating the construction of a raster scanning-type display device using a diffractive light modulator according to the present invention.

FIG. 2 is a view illustrating the construction of the raster scanning-type display device using the diffractive light modulator according to the embodiment of the present invention.

Referring to FIG. 2, the raster scanning-type display device using the diffractive light modulator according to the embodiment of the present invention includes a display optical system 102 and a display electronic system 104.

The display optical system 102 includes red, green and blue light sources 106R, 106G and 106B, and red, green and blue illustration optical units 108R, 108G and 108B that respectively correspond to the light sources 106R, 106G and 106B.

The display optical system 102 includes a diffractive light modulator 110 at least one element of which is assigned to each color and which forms diffracted light having a plurality of diffraction orders for each beam of incident light by modulating incident light having a corresponding color when the light having the corresponding color is incident on a corresponding assigned element from a corresponding illumination optical unit 108R, 108G or 108B, and a combining unit 112 that combines a plurality of beams of diffracted light having respective wavelengths and each having a plurality of diffraction orders, emitted from the diffractive light modulator 110, into a single beam of light.

The display optical system 102 includes a Schlieren optical unit 114 that divides the diffracted light having a plurality of diffraction orders, formed by the diffractive light modulator 110, according to diffraction order and passes diffracted light having one or more desired diffraction orders, selected from the diffracted light having a plurality of diffraction orders, therethrough, a projection and scanning optical unit 116 that condenses the diffracted light passed through the Schlieren optical unit 114 and performs raster scanning on condensed spot light in a two-dimensional image form, and a display screen 118.

The display electronic system 104 is electrically connected to the laser light sources 106, the diffractive light modulator 110, and the projection and scanning optical unit 116.

With reference to FIGS. 2 to 5, the operation of the raster scanning-type display device using a diffractive light modulator according to the embodiment of the present invention is described in detail below.

The red, green and blue light sources 106R, 106G and 106B of the display optical system 102 emit corresponding beams of light under the control of the display electronic system 104.

The illumination optical unit 108R, 108G or 108B corresponding to each color converts light, emitted from the light source 106R, 106G or 106B, into circular spot light or elliptical light so as to radiate the circular spot light or elliptical light onto the upper and lower micromirrors of the corresponding assigned element of the diffractive light modulator 110.

Each of the illumination optical units 108R, 108G and 108B may include, for example, a convex lens (not shown) and a collimator lens (not shown).

The concave lens converts the incident light, emitted from a corresponding light source 10R, 106G or 106B, into smaller circular spot light or elliptical light, a corresponding collimator lens converts the circular spot light or elliptical light into parallel light, and the resulting parallel light enters the diffractive light modulator 110.

Meanwhile, in the diffractive light modulator 110, at least one element is assigned to each color, and the micromirror of the element assigned to each color micromirror forms diffracted light having a plurality of diffraction orders by modulating the incident light.

Figure 3:
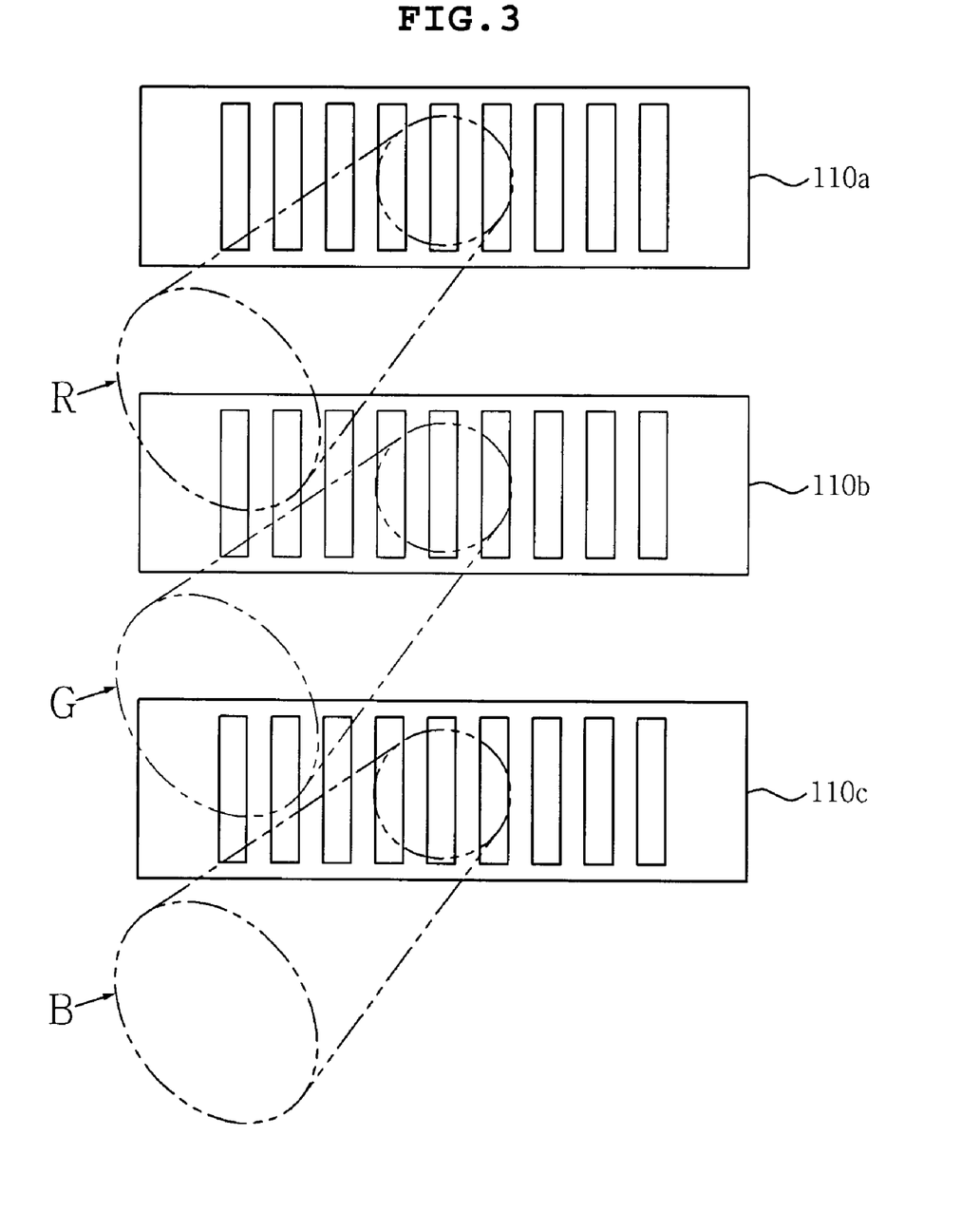
FIG. 3 is a plan view illustrating the case where beams of circular spot light are respectively radiated onto the micromirrors of the elements of an open hole-based diffractive light modulator, wherein the elements are assigned to respective colors.

As an example, as illustrated in FIG. 3, in the case where the diffractive light modulator 110 of the display optical system 102 includes three elements 110*a*, 110*b* and 110*c* and the three elements 110*a*, 110*b* and 110*c* are respectively assigned to red, green and blue, the red illumination optical unit 108R radiates elliptical light onto the micromirror of the element 110*a* of the diffractive light modulator 110 that is assigned to red, the green illumination optical unit 108G radiates elliptical light onto the micromirror of the element 110*b* of the diffractive light modulator 110 that is assigned to green, and the blue illumination optical unit 108B radiates elliptical light onto the micromirror of the element 110*c* of the diffractive light modulator 110 that is assigned to blue. Thereafter, each of the elements 110R, 110G and 110B forms diffracted light having a plurality of diffraction orders by modulating incident light having a corresponding wavelength.

That is, when each of the elements 110R, 110G and 110B moves vertically in the case where elliptical light is incident on the upper micromirror of the element 110R, 110G or 110B of the open hole-based diffractive light modulator 110 illustrated in FIG. 3, the incident light is reflected or diffracted due to the difference in vertical location between the upper micromirror and lower micromirror of the element 110R, 110G or 110B, and thereby reflected light or diffracted light having a plurality of diffraction orders is generated.

Meanwhile, although the case where a single element is assigned to each color has been described, as illustrated in FIG. 3, the same implementation is applicable to the case where a plurality of elements is assigned to each color. The diffracted light that is generated for a single wavelength using the plurality of elements described above has light intensity selectivity higher than that of the diffracted light that is generated for a single wavelength using a single element. As an example, when diffracted light is generated using four elements, only one element may be caused to generate diffracted light, two elements may be caused to generate diffracted light, three elements may be caused to generate diffracted light, or all four elements may be caused to generate diffracted light. Since diffracted light having four different light intensities can be obtained at the time of generating diffracted light, the selectivity of light intensity is improved. Furthermore, although elliptical light has been described in conjunction with FIG. 3, the same description is applicable to circular spot light.

The combining unit 112 combines diffracted light having a plurality of wavelengths, generated by the diffractive light modulator 110, into a single beam of light. For this purpose, the combining unit 112 includes, for example, two reflecting mirrors 112R and 112B, thereby combining diffracted light having a plurality of wavelengths.

The Schlieren optical unit 114 separates diffracted light having one or more diffraction orders from diffracted light having a plurality of diffraction orders when the diffracted light having a plurality of diffraction orders passes through the Schlieren optical unit 114. The Schlieren optical unit 114 includes, for example, a Fourier lens (not shown) and a filter (not shown), and selectively passes 0th-order diffracted light or ±1-order diffracted light, selected from incident diffracted light, therethrough.

Figure 4:
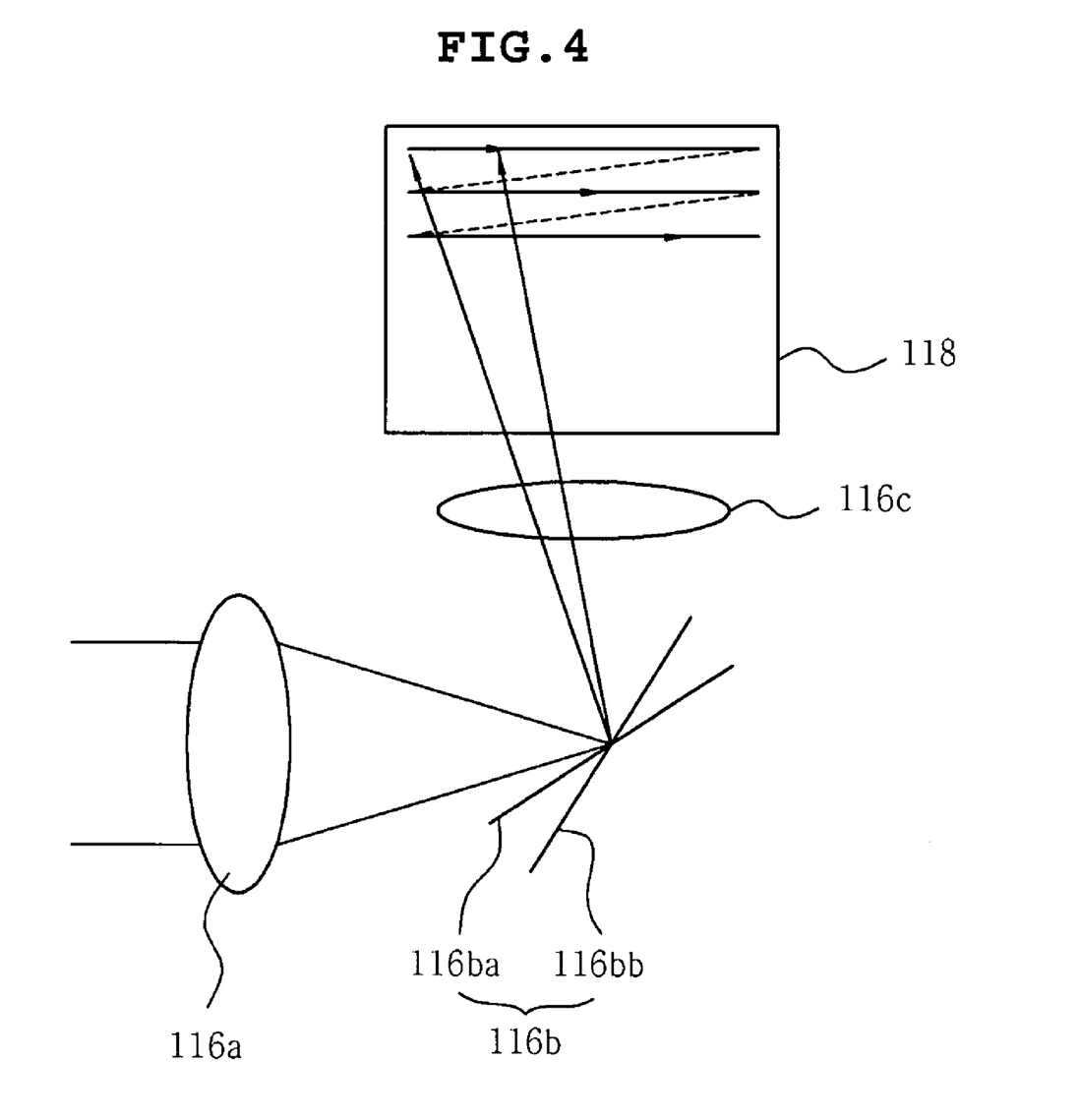
FIG. 4 is a detailed view illustrating the construction of the projection and scanning optical unit of FIG. 2.

The projection and scanning optical unit 116, as illustrated in FIG. 4, includes a condenser lens 116a, a scanning mirror 116b, and a projection lens 116c, and projects incident diffracted light onto the screen 118. That is, the projection and scanning optical unit 116 functions to form a spot by condensing a diffracted beam entering from the filter (not shown) onto the screen 118.

The condenser lens 116a condenses the diffracted beam, passed through the filter, onto the screen 118. Of course, a concave lens (not shown) may be provided behind the condenser lens 116a, and may change parallel light after condensing the diffracted beam passed through the filter, and project the changed parallel light onto the scanning mirror 116b.

The scanning mirror 116b includes an X-scanning mirror 116ba and a Y-scanning mirror 116bb, and the X-scanning mirror 116ba scans an incident spot across the screen 118 from the left to the right under the control of the display electronic system 104, and the Y-scanning mirror 116ba vertically scans the incident spot across the screen 118 under the control of the display electronic system 104.

A process in which the X-scanning mirror 116ba performs horizontal scanning from the left to the right, the Y-scanning mirror 116bb performs vertical scanning to a subsequent line, the X-scanning mirror 116ba perform horizontal scanning from the left to the right again, the Y-scanning mirror 116bb performs vertical scanning to a subsequent line again, and so on is referred to as raster scanning. Although raster scanning has been described as being performed in such a way as to repeat a process of performing scanning from the left to the right, changing the line and then moving the spot to the left end of the screen, raster scan may be performed in such a way as to repeat a process of performing scanning from the left to the right, performing vertical scanning to the right end of a subsequent line, performing scanning from the right to the left, and then changing the line.

The display electronic system 104 actuates the scanning mirror 116b of the projection and scanning optical unit 116. The projection and scanning optical unit 116 projects an image onto the display screen 118 and scans a line image across the display screen 118 in a raster scanning fashion so as to form a two-dimensional image on the display screen 118.

Meanwhile, although the method of displaying an image on the screen 118 using a single spot has been illustrated in FIGS. 2 to 4, it is possible to perform raster scanning using a plurality of spots.

Figure 5:
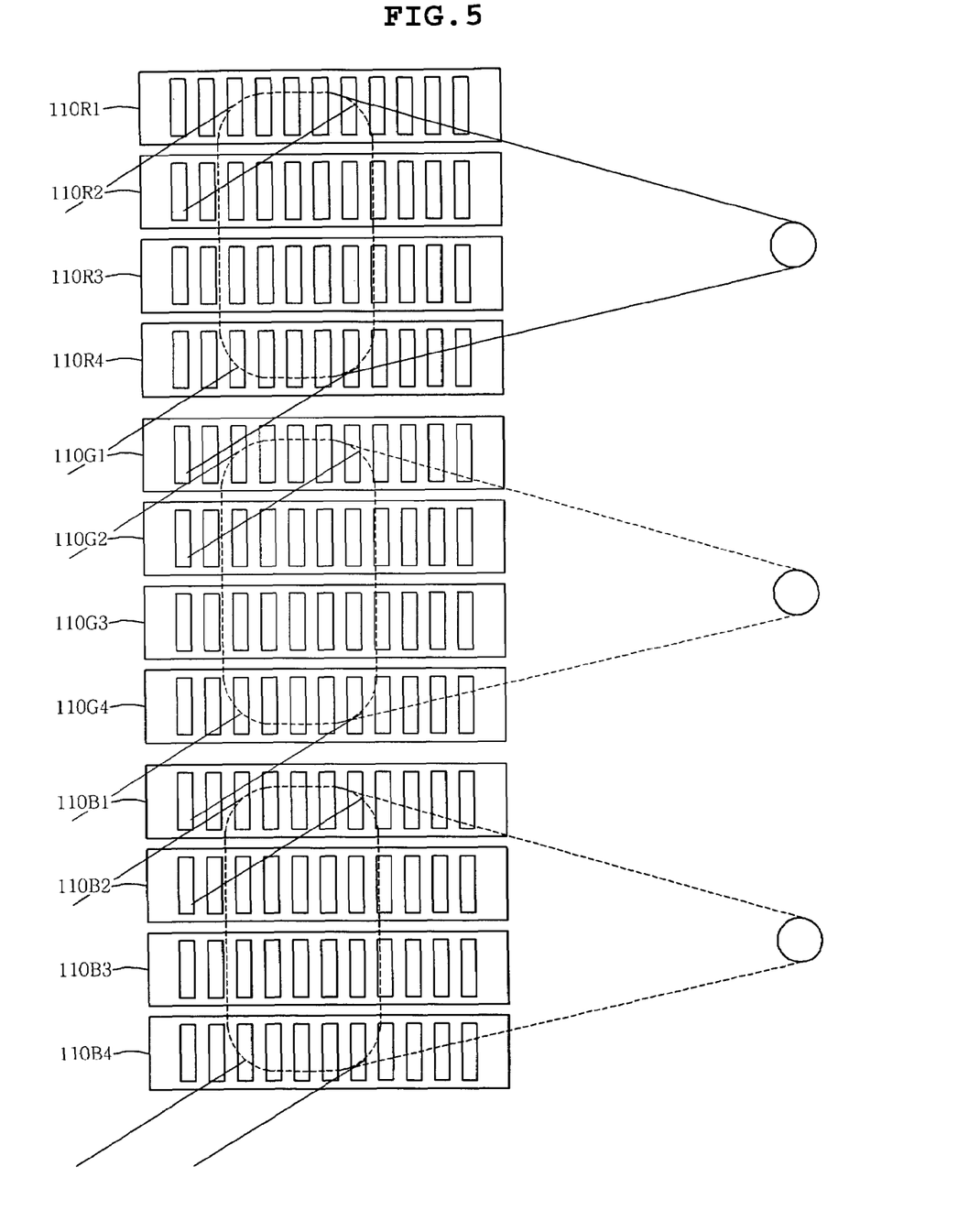
FIG. 5 is a plan view illustrating the case where a beam of elliptical light having a narrow and long line shape is radiated onto the micromirrors of the elements (for example, four elements) of the open hole-based diffractive light modulator according to another embodiment of the present invention, wherein a diffracted pixel is represented in a single divided pixel.

As an example, FIG. 5 is a plan view illustrating the case where elliptical light having a narrow and long line shape is radiated onto the four elements 110R1~110R4, 110G1~110G4, or 110B1~110B4 of the open hole-based diffractive light modulator. When four elements are assigned to the formation of a single spot, the projection and scanning optical unit 116 can perform raster scanning across the screen 118 using a single spot.

In FIG. 5, when a plurality of elements independently moves vertically, elliptical light having a narrow and long line shape is reflected or diffracted due to the difference in vertical location between the upper micromirror and the lower micromirror of each of the elements 110R1~110R4, 110G1~110G4, and 110B1~110B4, thereby forming diffracted light in the same manner as in FIG. 3.

According to the present invention, a precise optical system, such as a line beam shaper required for a one-dimensional illumination system, is not necessary.

Furthermore, according to the present invention, there is an advantage in that a single spot or a small number of spots, instead of 1080 spots, is used, thereby simplifying the construction of an optical system.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A raster scanning-type display device, comprising:
    a plurality of light sources for emitting a plurality of beams of light having respective colors;
    a diffractive light modulator comprising a plurality of elements with colors respectively assigned to the elements, and configured to modulate incident light while moving the elements according to external control signals and then to emit a plurality of beams of light having respective colors and each having a plurality of diffraction orders when the incident light having a plurality of colors is incident on corresponding elements;
    a plurality of illumination optical units for radiating the plurality of beams of light having respective colors, emitted from the light sources, onto the corresponding elements of the diffractive light modulator;
    a combining unit for combining the plurality of beams of light having respective colors and each having a plurality of diffraction orders, formed by the diffractive light modulator, together;
    a Schlieren optical unit for selecting diffracted light having one or more desired diffraction orders from the plurality of beams of light having respective colors and each having a plurality of diffraction orders, and passing the selected diffracted light therethrough; and
    a scanning optical unit for scanning the diffracted light, passed through the Schlieren optical unit, onto a screen in a raster scanning fashion.

2. The display device as set forth in claim 1, wherein the diffractive light modulator includes a plurality of open holes formed in each of the elements, a distal micromirror, formed in an element, and a proximal micromirror, formed in an insulating layer, form a separation of location and modulates incident light according to external control signals, thereby forming diffracted light having a plurality of diffraction orders.

3. The display device as set forth in claim 1, wherein each of the illumination optical units comprises:
    a concave lens for condensing the light emitted from a corresponding light source; and
    a collimator lens for converting the condensed light, emitted from the concave lens, into parallel light.

4. The display device as set forth in claim 1, wherein the Schlieren optical unit comprises:
    a Fourier lens for dividing the diffracted light having a plurality of colors and having a plurality of diffraction orders, emitted from the combining unit, according to diffraction order; and a filter for selecting diffracted light having one or more desired diffraction orders from the plurality of beams of diffracted light having a plurality of diffraction orders, which are passed through the Fourier lens, and passing the selected diffracted light having one or more desired diffraction orders therethrough.

5. The display device as set forth in claim 1, wherein the scanning optical unit comprises:

an X-scanner for scanning the diffracted light, passed through the Schlieren optical unit, in an X-axis direction; and a Y-scanner for scanning the diffracted light, passed through the Schlieren optical unit, in a Y-axis direction;

wherein the Y-scanner repeats a process of performing Y scanning to a subsequent line after the X-scanner completes scanning for a line in an X-axis direction.

6. The display device as set forth in claim 5, wherein the scanning optical unit further comprises a condensing unit for condensing the diffracted light, passed through the Schlieren optical unit, into spot light.

7. A raster scanning-type display device, comprising:

a plurality of light sources for emitting a plurality of beams of light having respective colors;

a diffractive light modulator comprising a plurality of elements with the elements grouped into element groups and colors respectively assigned to the element groups, and configured to modulate incident light while moving elements of a corresponding element group according to external control signals, and then to emit diffracted light having a plurality of diffraction orders when the incident light is incident on the elements of the corresponding element group;

a plurality of illumination optical units for radiating the plurality of beams of light having respective colors, emitted from the light sources, onto corresponding element groups of the diffractive light modulator;

a combining unit for combining the plurality of beams of light having respective colors and each having a plurality of diffraction orders, formed by the diffractive light modulator, together;

a Schlieren optical unit for selecting diffracted light having one or more desired diffraction orders from the plurality of beams of light having respective colors and each having a plurality of diffraction orders, and passing the selected diffracted light therethrough; and a scanning optical unit for scanning the diffracted light, passed through the Schlieren optical unit, onto a screen in a raster scanning fashion.

* * * * *